though preferably such polymers are useful as oil additives prior to the shearing tretment, it is not essential to the invention that the polymers possess this characteristic. The materials formed by shearing the polymers in the presence of the reactive amines have utility as oil additives. If the polymer prior to shearing improved a property of the oil, it was found that the material resulting from the shearing improved one or more other properties of the oil. If the polymer did not improve any known property of the oil prior to shearing, the material resulting from the shearing would improve one or more of the oil properties.

United States Patent Office 3,076,791
Patented Feb. 5, 1963

3,076,791
LUBRICATING OIL ADDITIVES OBTAINED BY SHEARING A POLYMER AND A MONOMER
William C. Hollyday, Jr., Watchung, Plainfield, and Monroe W. Munsell, Berkeley Heights, N.J., assignors to Esso Research and Engineering Company, a corporation of Delaware
No Drawing. Filed Sept. 1, 1960, Ser. No. 53,348
10 Claims. (Cl. 260—78.5)

This invention relates to a method of preparing new materials from polymers which comprises subjecting said polymers to shear in the presence of amines. The present invention also relates to the materials so produced and to their uses. More particularly, this invention relates to the method of incorporating pour point depressancy, detergency and shear stability properties into a polymer, thereby obtaining a material usable as an additive for lubricating oils and fuels.

It has been recognized by the art that polymers may be subjected to a high shear rate in the presence of various monomers and other materials in such a manner that a free radical reaction is initiated. At the conclusion of the free radical-initiated process, a new polymer is obtained which comprises the reaction product of the reactant polymer and the monomer or other material.

This invention is directed towards a process for preparing new materials which are useful as oil additives, by subjecting polymers and amines to a shearing force. Although preferably such polymers are useful as oil additives prior to the shearing tretment, it is not essential to the invention that the polymers possess this characteristic. The materials formed by shearing the polymers in the presence of the reactive amines have utility as oil additives. If the polymer prior to shearing improved a property of the oil, it was found that the material resulting from the shearing improved one or more other properties of the oil. If the polymer did not improve any known property of the oil prior to shearing, the material resulting from the shearing would improve one or more of the oil properties.

It is known that high molecular weight organic polymers prepared from olefins and unsaturated ester monomers such as polymers of esters of methacrylic and acrylic acids, isobutylene, ethylene, propylene, styrene and the like, are useful for improving the viscosity index of a lubricating oil. However, many of these polymers do not, in themselves decrease the pour point of a lubricating oil, for instance, isobutylene polymers. It has now been discovered and forms a feature of this invention that when polymers of unsaturated ester and olefin monomers are sheared in the presence of certain amines a new material is obtained. This material when placed in an oil improves the oil's viscosity index, depresses the pour point of the oil, and also improves the sludge dispersing properties of the oil.

It has also been discovered and forms a feature of the invention that the product obtained by shearing the polymers and amines is remarkably shear stable. The measure of shear stability is usually expressed in terms of relative shear breakdown (RSB). RSB is the figure obtained when the viscosity loss of the oil blend after running in a standard test engine (usually the McIntyre pump) is divided by the initial viscosity increase in the base oil caused by the additive polymer. Thus shear stability becomes greater as the RSB value decreases. The shear stability is primarily a function of the molecular weight of the additive. It is important that oil blends containing polymers have resistance to shear degradation because a loss in viscosity due to breakdown means an increase in oil consumption.

By the method of this invention oil blends containing sheared polymer amines are obtained which have a shear stability almost equal to the base stock itself. For instance, when polyisobutylene is sheared in the presence of amines a product is obtained having an RSB of about 1%, which is almost equal to that of the base oil alone which is zero. The unsheared polyisobutylene has an RSB of 15% which is quite acceptable for commercial use in motor oils. An oil blend can be thickened to the same viscosity level with only about 10% more of the sheared product than the unsheared. Thus, oil blends of comparable viscosity having the almost unheard of value of only 1% RSB can be obtained at an increase of only 10 wt. percent in overall polymer requirements as compared with the unsheared polyisobutylene. Such a high degree of shear stability is normally not required in motor oil blends but it is very advantageous in gear and hydraulic oils which are not changed as easily and as often as motor oils.

The sheared polymer/amine materials of the invention also are useful in fuel oils and jet fuels to disperse sludge and haze precursors and to lower the pour points of such fuels.

In general, the sheared polymers of the invention are useful in oleaginous materials such as fuel oils, lubricating oils, hydraulic oils, and the like in amounts in the range of 0.01 to 15 wt. percent e.g., 0.01 to 5 wt. percent.

Generally from 0.01 to 1.00, e.g., 0.02 to 0.60 molar proportions of amine per one molar proportion of polymers are sheared together. The polymer and amine can be either a liquid or a solid at room temperature. If desired, the amine and polymer reactants can be sheared in the presence of a suitable solvent such as a solvent neutral mineral oil. The products formed in the reaction may be recovered by any suitable means such as precipitation, solvent extraction, distillation to remove solvent, and the like. Preferably the whole reaction mass is used as is without any separation.

Polymers suitable for use in the invention may be a homopolymer, that is, a polymer consisting of a single constituent monomer, or it may be a copolymer consisting of two or more constituent monomers. These polymers may be prepared by conventional polymerization or copolymerization techniques well known in the art. The preparation of such polymeric materials does not constitute part of this invention.

The polymers useful in the method of the invention include oil soluble homopolymers and copolymers formed from $C_2$ to $C_{30}$ olefins and $C_4$ to $C_{30}$ unsaturated esters. The homopolymers are exemplified by the following:

Polymers of monoolefins which may be aliphatic or have an aromatic substituent, e.g., ethylene, propylene, isobutylene, alkyl styrene, etc.

Polymers of diolefins, e.g., butadiene, isoprene, etc.

Polymers of esters of acrylic and of methacrylic acids, e.g., decyl acrylate, lauryl methacrylate, mixed $C_8$ to $C_{18}$ methacrylates, etc.

Polymers of vinyl esters, e.g., vinyl 2-ethylhexoate, the vinyl ester of coconut acids, the vinyl ester of $C_{10}$ Oxo acids made by the oxonation of tripropylene, etc.

Polymers of vinyl ethers, e.g., vinyl isobutyl ether, vinyl decyl ether, the vinyl ether of $C_8$ Oxo alcohol made by the oxonation of $C_7$ monoolefin (propylene-butylene copolymer), etc.

Polymers of esters of $\alpha,\beta$-unsaturated dicarboxylic acids, e.g., octyl fumarate, lauryl maleate, the aconitate and itaconate esters of mixed alcohols obtained by the hydrogenation of coconut oil acids, etc.

The copolymers are exemplified by the following:
Copolymers of various olefins, e.g., ethylene and protransic viscosity of 0.52 was recovered and then tested for pour point depressancy.

The test for pour point depressancy was carried out according to the following procedures. Three Mid-Continent base stocks are used in this test. They are referred to as 1, 2 and 3 for reference. Oil 1 had an SAE rating of 10 and a +10° F. pour point. Oil 2 had an SAE rating of 20 and a +15° F. pour point. Oil 3 had an SAE rating of 30 and a +15° F. pour point. Each of the base stocks is divided into four portions. These are labelled 1A, 1B, 1C, 1D, 2A, 2B, 2C, 2D, and 3A, 3B, 3C, and 3D. To each of 1A, 2A, and 3A was added 0.02 wt. percent of the product of Example I. To each of 1B, 2B, and 3B was added 0.10 wt. percent of the product of Example I. To each of 1C, 2C, and 3C was added 0.50 wt. percent of the product of Example I. To each of 1D, 2D, and 3D was added 0.50 wt. percent of the unsheared polyisobutylene/amine mixture of Example I. The pour point of the 12 compositions were then determined. The results are summarized in Table I following.

*Table I*

PROPERTIES OF POLYISOBUTYLENE/AMINE MIXTURE SUBJECTED TO SHEAR

| Polymeric Additive | Wt. Percent Additive | Pour Point, ° F. in Mid-Continent Base Stock Indicated | | |
|---|---|---|---|---|
| | | SAE 10 1 | SAE 20 2 | SAE 30 3 |
| None | 0.00 | +10 | +15 | +15 |
| A—Polyisobutylene/Amine, Sheared | 0.02 | 0 | −5 | 0 |
| B—Polyisobutylene/Amine, Sheared | 0.10 | −5 | −20 | −5 |
| C—Polyisobutylene/Amine, Sheared | 0.50 | −25 | −20 | −15 |
| D—Polyisobutylene/Amine, Unsheared | 0.50 | −5 | −5 | 0 |

As can be seen from this example and the accompanying table, various Mid-Continent base stocks having the polyisobutylene/amine sheared additive placed therein experience sizable reductions in pour point. For instance, 0.5 wt. percent of the additive placed in various Mid-Continent base stocks causes a reduction in pour point of from 30 to 35° F., whereas 0.5 wt. percent of a polyisobutylene/amine combination not subjected to shearing forces causes a reduction in pour point in the same base stock of only from 15° F. to 20° F. The reduction in pour points caused by the unsheared amine/polyisobutylene mixture can be attributed to the presence of the amine since polyisobutylene alone is not a pour point depressant. Therefore, it is seen that the additive of the invention causes a very substantial reduction in pour points.

In order to demonstrate the shear stability of the product of Example I, several oil blends were prepared from equal amounts of the same base stock which had an initial viscosity at 210° F. of 45.7 SUS. 2.15 wt. percent of polyisobutylene polymer (identically the same as the original polymer before shearing) was added to one portion of the oil blend and raised the viscosity of the oil blend to 68.0 SUS. Another oil blend was prepared by adding 2.37 wt. percent of the sheared polyisobutylene polymer and amine to the same amount of oil which also raised the viscosity of the oil base to 68.0 SUS at 210° F. The original polyisobutylene has an RSB of 15%. It requires only 10% more of the sheared material to obtain an oil blend having the same viscosity as the unsheared polyisobutylene oil blend. However, the Example I material has an RSB of only 1%. Therefore, a 10% greater quantity of sheared material with an RSB of 1% thickens an oil to the same extent as the original polymer with an RSB of 15%. The results of this demonstration are summarized in the following table.

*Table II*

| Polymer in Oil Blend | Wt. Percent Polymer | Relative Amount of Polymer | Oil Blend | |
|---|---|---|---|---|
| | | | SUS/ 210° F. | Relative Breakdown, Percent |
| None (Base Stock) | 0.00 | | 45.7 | 0 |
| Original Polybutene | 2.15 | 1.00 | 68.0 | 15 |
| Homogenized Polyisobutylene/Amine | 2.37 | 1.10 | 68.0 | 1 |

In the following examples a mixture of primary and tertiary amines is used having the composition: 0.145 mole of primary octyl amine, 0.095 mole of tertiary decyl amine, 0.285 mole of primary dodecyl amine and 0.285 mole of primary tetradecyl amine. The ratio of $C_8/C_{10}/C_{12}/C_{14}$ alkyl groups was approximately 1/2/2/2.

EXAMPLE II

Example I was repeated exactly except that 20 grams of the above-described amine mixture in 740 grams of a mixture of solvent neutral and heating oil were used; the homogenization was for 30 minutes at 300 p.s.i., which is equivalent to about 60 passes through the shearing orifice and pressure plate.

EXAMPLE III

Example II was repeated exactly except that the polymer was a copolymer of vinyl acetate and di-decyl fumarate and had an intrinsic viscosity of about 1.0. The copolymer was prepared from the following materials, all percentages being by weight: 18.7% of di-tallow ($C_{16}$–$C_{18}$) fumarate which is prepared by reacting tallow alcohols which are a mixture of $C_{16}$ and $C_{18}$ alkanols with fumaric acid and 49.4% di-$C_8$ Oxo fumarate which is prepared by reacting $C_8$ Oxo alcohols with fumaric acid. Oxo alcohols are prepared from olefins which are reacted with carbon monoxide and hydrogen to form aldehydes. The aldehydes are hydrogenated to form very highly branched alcohols.

EXAMPLE IV

Example III was repeated exactly except that the polymer was a polymethacrylate with an intrinsic viscosity of about 0.5 and the homogenization was carried out for about 15 minutes. The alkyl groups in the polymethacrylate averaged about $C_{10}$ and were made up of approximately equal portions of $C_4$, $C_8$, $C_{12}$ and $C_{18}$ alkanols.

EXAMPLE V

Example IV was repeated exactly except that the polymethacrylate had an intrinsic viscosity of about 0.7.

EFFECTIVENESS OF PRODUCTS AS DETERGENT INHIBITORS

The products of Examples II, III, and V were evaluated as detergent inhibitors in the sludge precursor test.

In the sludge precursor test a lube oil containing 2.5 wt. percent of the material to be tested was heated at 200° F. for ½ hour in the presence of a weighed amount of sludge precursor and sulfuric acid. The sludge precursor is the highly oxygenated, but still oil-soluble, material resulting from incomplete combustion which is blown past the pistons into the oil. It is readily converted into insoluble sludge by heat and acid catalysis. The crucible containing the heated mixture is emptied and rinsed with heptane solvent. The dried adhering sludge was rated on a visual demerit scale. On this scale zero is the rating for a completely clean surface and 10 is the rating for a heavily coated surface. The lube oil used was a solvent extracted neutral.

Eight materials were evaluated in the sludge precursor test described above using identical amounts of all materials for each evaluation. Three tests were run on each material to get an average. These materials were (1) the polyisobutylene described in Example II, (2) the sheared product of Example II, (3) the fumarate/vinyl acetate polymer described in Example III, (4) the polymer of (3) with 50 wt. percent of Armeen 2C based on the weight of polymer, (5) the sheared product of Example III, (6) the polymethacrylate described in Example V, (7) the polymethacrylate of (6) with 50 wt. percent of Armeen 2C based on the weight of the polymer, and (8) the sheared product of Example V. The results of these tests are summarized in the following table.

*Table III*

SLUDGE PRECUSOR TEST

| Additive | Demerit (Average of Three) |
| --- | --- |
| 1. Polyisobutylene of Example II | 5 |
| 2. Sheared Product of Example II | 3½ |
| 3. Fumarate/Vinyl Acetate of Example III | 3 |
| 4. Fumarate/Vinyl Acetate of Example III plus 50 wt. Percent of Armeen 2C | 2½ |
| 5. Sheared Product of Example III | 1 |
| 6. Polymethacrylate of Example V | 5 |
| 7. Polymethacrylate of Example V plus 50 wt. Percent of Armeen 2C | 3½ |
| 8. Sheared Product of Example V | 1½ |

As can be seen from the table, the sheared product of the invention gave improved results in every instance over the unsheared polymers. The sheared fumarate/vinyl acetate and methacrylate polymers gave particularly good results even when compared with the unsheared polymers in the presence of amines.

EFFECTIVENESS OF PRODUCTS AS POUR POINT DEPRESSANTS IN HEATING OILS

The sheared products of Examples II, IV and V were evaluated as pour point depressants in a No. 2 domestic fuel oil having a pour point of $+10°$ F. For comparison the pour depressant effect of the original polymers from which the sheared products were prepared was also determined. The results are summarized in the following table.

*Table IV*

POUR DEPRESSANT ACTIVITY IN HEATING OIL [1]

| Material Tested | Wt. percent Polymer | Pour Point, °F., Using Polymer Sample Indicated | |
| --- | --- | --- | --- |
| | | Original | Amine/Homogenized [2] |
| Example II | 0.01 | +10 | 0 |
| | 0.02 | +10 | −5 |
| | 0.03 | +10 | −5 |
| | 0.05 | +10 | 0 |
| | 0.10 | +10 | 0 |
| Examle IV | 0.01 | +5 | +5 |
| | 0.02 | +5 | 0 |
| | 0.03 | +5 | −5 |
| | 0.05 | +5 | −5 |
| | 0.10 | 0 | −10 |
| Example V | 0.01 | +10 | +5 |
| | 0.02 | +10 | 0 |
| | 0.03 | +5 | −5 |
| | 0.05 | 0 | −15 |
| | 0.10 | 0 | −20 |

[1] Original pour point of heating oil (No. 2 domestic fuel oil) was +10° F.
[2] Product from examples cited.

As can be seen from the table, the sheared products exert a high degree of pour depressancy as compared with the original polymers. The sheared product of Example V is particularly effective. It reduces the pour point 30° F. while the polymethacrylate only reduces the pour point 10° F.

*Example VI*

To additionally illustrate the invention, Example I is repeated exactly except the polymer is a copolymer of a $C_{13}$ acrylate ester and a $C_{14}$ methacrylate ester.

*Example VII*

To further illustrate the invention Example I is repeated exactly except that the amine has the formula $(CH_3)CH_2—CH_2—O—(CH_2)_3—CH_2)_2NH$.

In summary, the invention relates to polymeric materials prepared by subjecting polymers prepared from monomers selected from the group consisting of $C_4$ to $C_{30}$ unsaturated esters, $C_2$ to $C_{30}$ olefins and mixtures thereof to shear in the presence of amines. The amines have $C_1$ to $C_{30}$, e.g. $C_5$ to $C_{20}$, hydrocarbon or oxygen substituted hydrocarbon substituents. Primary or secondary amines are preferred, particularly those having substituents which are alkyl groups derived from fatty acids. The polymeric materials obtained from the shearing are useful additives for oils and fuels.

What is claimed is:

1. A method of preparing a polymeric material useful as an oil additive comprising subjecting one molar proportion of a polymer having an intrinsic viscosity of 0.2 to 10 prepared from monomers selected from the group consisting of $C_4$ to $C_{30}$ unsaturated esters, $C_2$ to $C_{30}$ olefins and mixtures thereof and 0.01 to 1.00 molar proportion of amine represented by the formula:

$$R'—N—R$$
$$\;\;\;\;\;|$$
$$\;\;\;R''$$

wherein R, R' and R'' are selected from the group consisting of hydrogen, hydrocarbon and oxygen substituted hydrocarbon, and N is a nitrogen atom, to shearing at above 1,000 reciprocal seconds of shear for a time sufficient to effect a degradation of said polymer such that when the sheared and unsheared polymers are added respectively to two identical samples of an oil stock, in such amounts that both polymer-in-oil mixtures exhibit the same elevated viscosity, that mixture containing the sheared polymer will display a greater stability to shearing, manifest by a lower relative shear breakdown number, than that of the mixture containing the unsheared polymer.

2. A polymeric material useful as an oil additive prepared by the method of claim 1.

3. A material according to claim 2 wherein said polymer is the copolymer of a $C_4$ to $C_{20}$ vinyl ester and a $C_7$ to $C_{24}$ alkyl fumarate.

4. A material according to claim 2 wherein said polymer is that formed by polymerizing $C_9$ to $C_{24}$ alkyl esters of methacrylic acid.

5. A material according to claim 2 wherein said polymer is that formed by polymerizing $C_8$ to $C_{23}$ alkyl esters of acrylic acid.

6. A material according to claim 2 wherein said polymer is that formed by copolymerizing $C_9$ to $C_{24}$ alkyl esters of methacrylic acid with $C_8$ to $C_{23}$ alkyl esters of acrylic acid.

7. A material according to claim 2 wherein said polymer is that formed by polymerizing $C_2$ to $C_{10}$ olefins.

8. A method according to claim 1 wherein R is hydrogen and R' and R'' are $C_1$ to $C_{22}$ alkyl groups.

9. A method according to claim 8 wherein said shearing force is from 10,000 to 1,000,000 reciprocal seconds.

10. A method of preparing a polymeric material useful as an oil additive comprising subjecting one molar proportion of a polymer having an intrinsic viscosity of 0.3 to 2.0 prepared from monomers selected from the group consisting of $C_4$ to $C_{26}$ unsaturated esters, $C_2$ to $C_{10}$ olefins and mixtures thereof, and 0.02 to 0.60 molar proportion of amine represented by the formula:

$$R'—N—R$$
$$\;\;\;\;\;|$$
$$\;\;\;R''$$

wherein R, R' and R'' are selected from the group consisting of hydrogen, hydrocarbons and oxygen substituted hydrocarbons, and N is a nitrogen atom, to shearing of from 10,000 to 1,000,000 reciprocal seconds of shear for a time sufficient to effect a degradation of said polymer such that when the sheared and unsheared polymers are added respectively to two identical samples of an oil stock, in such amounts that both polymer-in-oil mixtures exhibit the same elevated viscosity, that mixture containing the sheared polymer will display a greater stability to shear, manifest by a lower relative shear breakdown number, than that of the mixture containing the unsheared polymer.

References Cited in the file of this patent

UNITED STATES PATENTS

| | | |
|---|---|---|
| 2,852,565 | Nozaki | Sept. 16, 1958 |
| 2,876,213 | Bartlett et al. | Mar. 3, 1959 |

OTHER REFERENCES

Jellinek: Degradation of Vinyl Polymers, published 1955, Academic Press Publishers, New York, N.Y., pp. 314, 315.